S. D. MADDIN.
Harvester.
No. 203,352. Patented May 7, 1878.
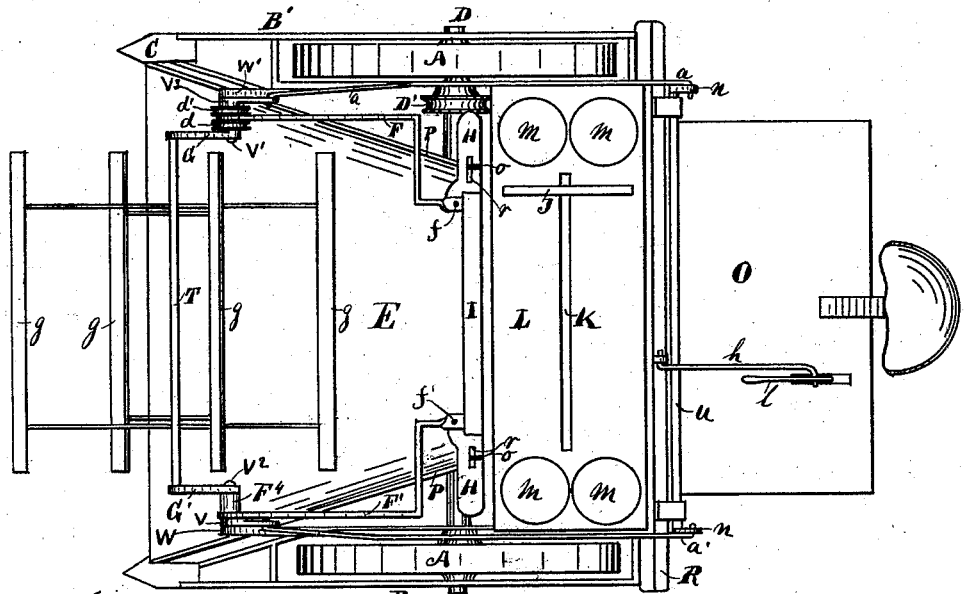
Fig. 1.
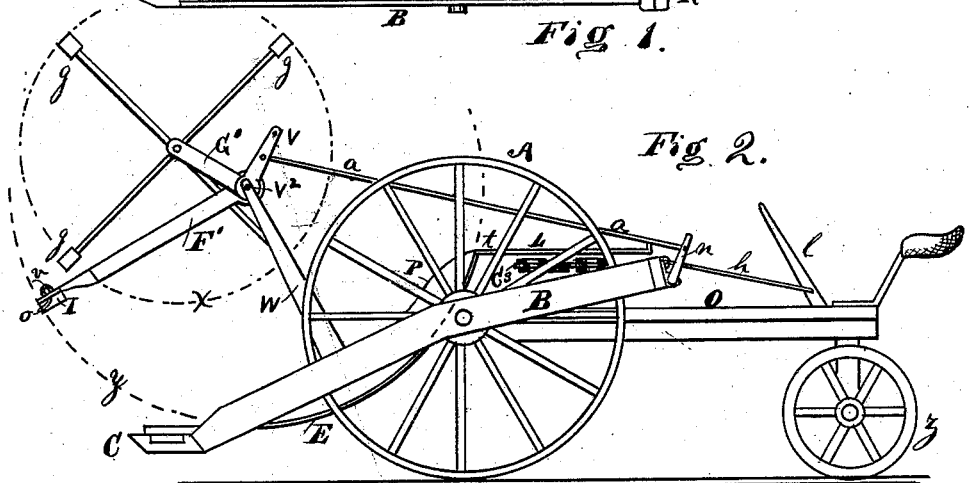
Fig. 2.
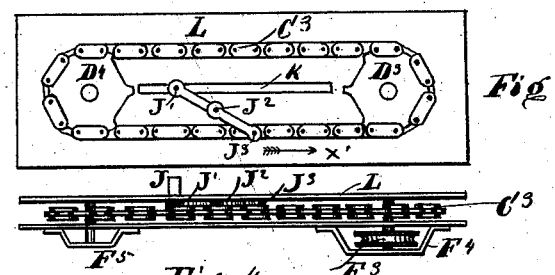
Fig. 3.
Fig. 4.
Witnesses
Josie Smith
Ida Smith
Inventor
Samuel D. Maddin
Per E. O. Frink
Atty

UNITED STATES PATENT OFFICE.

SAMUEL D. MADDIN, OF INDIANAPOLIS, INDIANA.

IMPROVEMENT IN HARVESTERS.

Specification forming part of Letters Patent No. 203,352, dated May 7, 1878; application filed February 3, 1877.

*To all whom it may concern:*

Be it known that I, SAMUEL D. MADDIN, of Indianapolis, county of Marion, State of Indiana, have invented certain new and useful Improvements in Combined Harvester and Binder, of which the following is a description, reference being had to the accompanying drawings.

The object of my invention is a combined harvester and binder.

My invention consists of the construction, arrangement, and combination of devices that will be hereinafter fully set forth in the accompanying specification and claims.

Many of the devices in the present application resemble those set forth in my previous pending application, and to such devices I now make no broad claim.

Figure 1 represents a plan view of my improved combination harvester and binder. Fig. 2 is a side elevation of the same. Figs. 3 and 4 represent plan and side views of the mechanism that operates the grain-carrier.

The front section of the machine is mounted on wheels A A, and the rear section on the wheels Z, both being united together in the same manner as in my former pending application—*i. e.*, the rear section is attached to the main axle of the front section.

The front section has a frame, B B', that is mounted on the axle D. The floor E has no openings in it, is formed with a curve from the cutter-bar to above the axle D, is secured to the frames B B' and cutter-bar frame in front, and also to the axle D at the rear, extends above the axle D, and is connected with the binding-platform L at $t$, Fig. 2. The floor E is also provided with curved sides P P, the object of which will be hereinafter described.

On the side frames B B' are secured the standards W W', (shown in Fig. 2,) and to the upper end of these standards are attached studs $V^1$ $V^2$, on which the crank-arms V G G' $V^3$ operate, as follows: On the stud $V^1$, Fig. 1, the arms $V^3$ and G are attached, the arms being connected together by a sleeve or tube which operates on the stud $V^1$, and the sheaves $d$ $d'$ operate on the tube or sleeve. The sheaves $d$ $d'$ are secured to the arm F, the operation of which will be hereinafter described. One of the sheaves, $d$, is designed to communicate motion to the reel $g$ $g$ by means of another sheave (not shown) on the end of the reel-shaft T and a belt. The other sheave, $d'$, revolves the arms F $F^1$ and bar I by means of a belt connected with sheave $D'$ on the axle D.

On the stud $V^2$ the arms V and G' are connected together by the sleeve or tube in the same manner, and the arm $F^1$ is attached to the outer tube $F^4$, that operates on the inner sleeve.

The reel $g$ $g$ revolves on its axle in the manner shown in Fig. 2, and the arms F $F^1$, with cross-bar I, revolve eccentrically to the reel, as shown in Fig. 2. The reel $g$ $g$ can be raised and lowered by means of the rods $a$ $a$, which are attached to the arms V $V^3$ and to the arms $n$ $n$ of the rear shaft $u$, thus allowing the reel to work close to the curved floor E when down with a regular motion, while at the same time the arms F $F^1$ revolve eccentrically thereto.

The cross-bar I is allowed to engage with the grain that is cut, and follows the reel-bars $g$ $g$ partially, but closely follows the curved table or floor E, as indicated by the dotted lines $y$, and carries the cut grain up with it until it deposits the same on the binder-table L.

The arms F $F^1$ are bent inwardly and securely bolted to the end of the bar I, and the pieces H at each end are pivoted or hinged to the ends of the arms F $F^1$, at $f$ $f'$. (Shown in Fig. 1.) Each hinged piece H is provided with a slot, $r$, through which the bent ends of the spring $o$ operates. This spring $o$ is secured on one side of the bar I by eyebolts or other means, and acts as a spring to straighten out the hinged pieces H after they have been closed up by passing up the inclined sides P of the floor E, and as they spring open at $t$, Fig. 2, above the binder-floor L, the bar I is prevented from dropping back or from being revolved backward.

The binder-floor L has openings $m$ $m$ at each end, arranged so as to allow the binders at each side of the machine to stand on the rear platform O, and thus prevent their weight from tilting the front part of the machine. The binding-floor L has a long slot, K, in its center, in which the grain-carrier J moves from side to side of the machine, and carries all grain deposited on the floor L to the binders alternately.

The slide or carrier J is operated as follows: Below the floor L, Figs. 3 and 4, are arranged two chain-wheels, $D^3$ $D^4$, which revolve in suitable boxes or bearings $F^4$ $F^5$. Around these wheels the chain $C^3$ operates. On one link of the chain $C^3$ is pivoted one end of the link $J^3$, and this link is pivoted at $J^2$ to another link, which in turn is pivoted to the lower end of the slide or carrier J.

The operation of these devices is as follows: As the chain $C^3$ is moved in the direction of the arrow $x'$, the links $J^2$ $J^1$ draw the carrier J to the end of the slot K nearest the pulley $D^3$. Here the carrier stops, but the chain continues to go on around the pulley $D^3$, carrying with it the linked links $J^1$ $J^2$, which double up in so passing around, and when they straighten out on the opposite side again move the carrier J to the other end of slot K. The chain is operated by a belt or chain on the sheave $F^3$, and on another sheave (not shown,) attached to the axle D.

The stoppage of the carrier J at each end of the slot K while the links $J^1$ $J^2$ are passing around the wheels $D^3$ $D^4$ allows the bar I, by means of its arms F $F^1$ and operating mechanism, to make a revolution, and bring up and deposit a fresh load of cut grain on the floor L in time for the carrier J to convey it by its next movement to the binders at the sides of the machine. This is done in an alternate manner, first to one side and then to the other side of the floor L, thus giving the binders at each side of the machine regular amounts of grain to bind.

I do not broadly claim any of the devices shown in my former application now pending in the United States Patent Office.

What I claim as new, and wish to secure by Letters Patent, is—

1. The combination of the arms W W', the studs $v^1$ $v^2$, carrying the rotating arms F $F^1$ and bar I, the arms G G, carrying the eccentric-shaft T and its reel, and the crank-shaft $u$, connected to the arms V $V^1$ by the rods $a$, all constructed, arranged, and operating as set forth.

2. The combination, with the floor E and its converging sides, of the revolving arms F $F^1$, having at the ends the stationary bar I, its hinged pieces H, and springs $o$, all constructed, arranged, and operating as set forth.

3. The combination, with the carrier J, sliding in a slot in the floor L, and with the wheels $D^3$ $D^4$, carrying an endless chain, of the two jointed links $J^1$ $J^2$, connected to the carrier and to the chain, and operating as set forth.

In testimony whereof I have signed my name to this specification in the presence of two subscribing witnesses.

SAMUEL D. MADDIN.

Witnesses:
JOHN J. W. BILLINGSLEY,
J. Q. A. NEWROM.